May 7, 1929.  S. S. SHEARS  1,711,813
VEHICLE SPRING ARRANGEMENT
Filed June 20, 1925
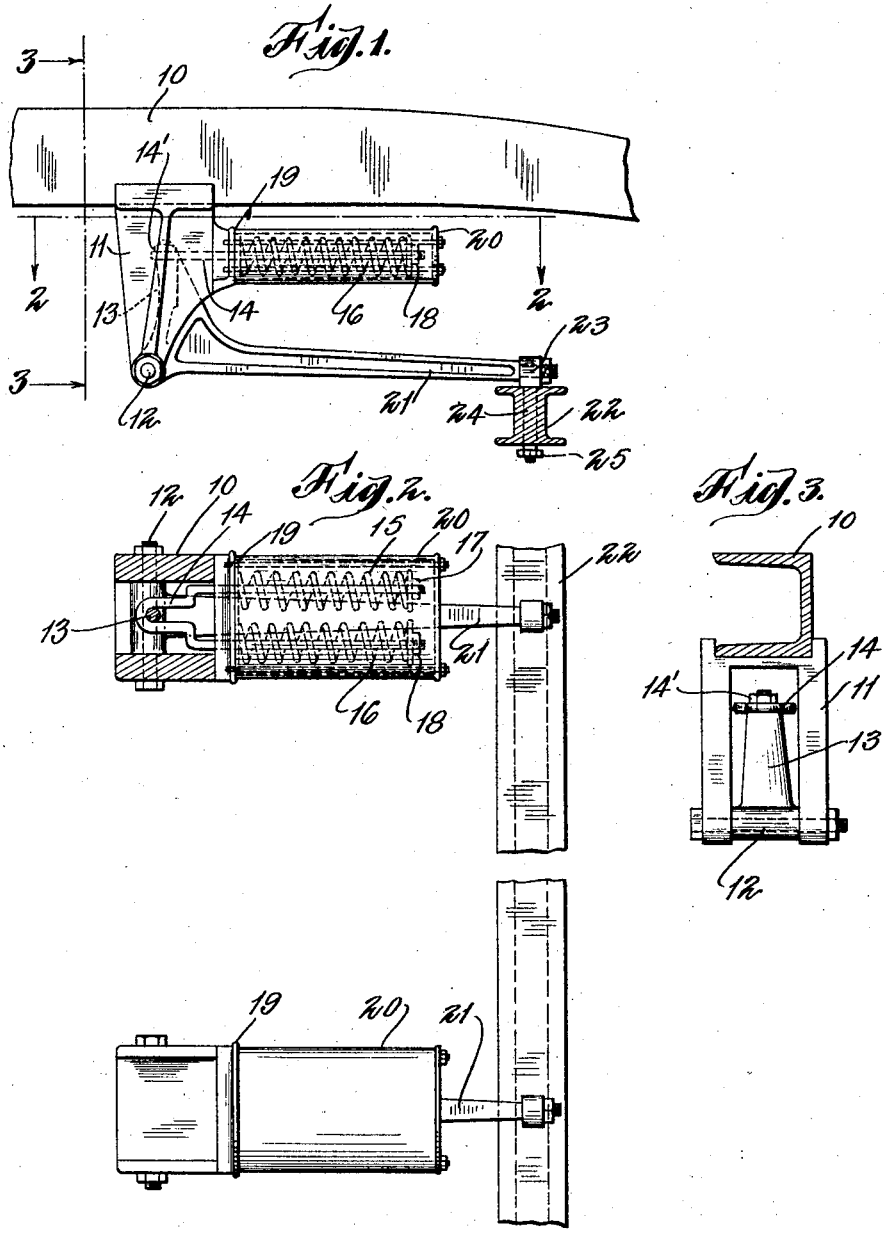
Inventor
Sumner S. Shears
By his Attorney
George C. Heinmore Patented May 7, 1929.

1,711,813

UNITED STATES PATENT OFFICE.

SUMNER S. SHEARS, OF BROOKLYN, NEW YORK.

VEHICLE SPRING ARRANGEMENT.

Application filed June 20, 1925. Serial No. 38,519.

This invention relates to improvements in vehicle springs, as they are for instance described in my Patents Nos. 1,336,468 and 1,505,222, issued April 13th, 1920, and August 19, 1924, respectively and the principal and main object of the invention is to provide an indirect vehicle spring arrangement, and reduce shock and vibration to the vehicle proper, by the application of the mechanical principle of leverage reduction, by which method such shock and vibration should be reduced in direct proportion to the leverage ratio obtaining.

Another object of the invention is the provision of a vehicle spring arrangement in which coil springs may take the place of the accepted leaf springs in common use, the advantages of coil springs being long recognized but never found applicable by the direct method.

These and other objects and advantages of my invention will become more fully known as the description thereof proceeds, and will then be more specifically defined in the appended claims.

In the accompanying drawing, forming a material part of this disclosure:

Fig. 1 is a side elevation of the vehicle spring constructed according to my invention, attached to the frame and axle of a vehicle.

Fig. 2 is a top plan view thereof, seen in the direction of arrows 2—2 of Figure 1.

Fig. 3 is an end view, partly in section, on line 3—3 of Figure 1.

A vehicle frame 10 has attached thereto a bracket 11 in the shape of an inverted U, the lower ends of the brackets of which are perforated, on which is fulcrumed as at 12, a bell-crank lever, the shorter arm 13 of which engages U-shaped rod 14 engaging said lever and carrying on either side coil springs 15 and 16 in such manner that the same are compressed or expanded according to the movements of the lever, said U-rod carrying nuts 17 and 18 at its ends against which the outer ends of the coil springs rest, and which allow a tensioning of the coil springs, while front ends of said springs abut a boss formed on the depending frame bracket.

The long arm 21 of the bell-crank lever is connected to the axle 22 of the vehicle. A two-way swivel joint 23 absorbs torque, the eye-swivel bolt 24 passing through the axle and carrying at a limited distance therefrom, a nut 25.

It will be clear that in this manner the load of the vehicle will be carried by the coil springs which are compressed by the oscillations of the bell-crank lever, the long arm of which may engage a two-way swivel connected to the axle in order to provide for possible twist or torque. The coil springs can be adjusted by the proper operation of the nuts.

It is to be understood that while I have shown and described one form of my spring arrangement as an example, such changes may be made as fall within the scope of the appended claims without departure from the spirit of the invention and the principle involved.

Having thus described my invention, what I claim as new, and desire to secure by Letters Patent, is:

1. In combination with a vehicle frame and axle, a bracket depending from the frame, a bell-crank lever pivotally fulcrumed at the lower part of said bracket in such manner as to provide a substantial leverage ratio, rods carried by said bracket, coil springs carried by said rods, nuts on said rods to adjust the tension of said springs, a swivel eye bolt vertically arranged through said axle, the long arm end of said lever engaging the eye of said swivel eye bolt and maintained by a nut so placed as to allow free turning of the lever end in said eye and the short arm of the lever engaging said rods in such manner as to compress and expand said coil springs according to the movement of the lever.

2. In combination with a vehicle frame and axle, a bracket depending from the frame, a bell-crank lever of substantial leverage proportions pivotally fulcrumed at its bend to the lower portion of said bracket, rods slidingly carried through openings in said bracket, coil springs surrounding said rods, one end of said springs resting against said bracket, the other end of said springs resting against an adjusting nut on the end of said rods, a swivel eye bolt running vertically through the axle, a nut on the bottom of said eye bolt, the threads of which being so limited as to allow free turning of said eye bolt in said axle, the end of the long arm of the lever engaging the eye of said eye bolt, a maintaining nut on the end of said lever, the threads on said lever being so limited as to allow free turning of said lever end in the eye of said eye bolt, and the short arm of said lever engaging said rods in such manner as to compress and expand said coil springs according to the oscillations of said lever.

Signed at New York in the county of New York and State of New York this 26th day of May, A. D. 1925.

SUMNER S. SHEARS.